Sept. 19, 1944.   B. R. BENJAMIN   2,358,298
TRACTOR-MOUNTED IMPLEMENT
Filed Jan. 13, 1942   2 Sheets-Sheet 1
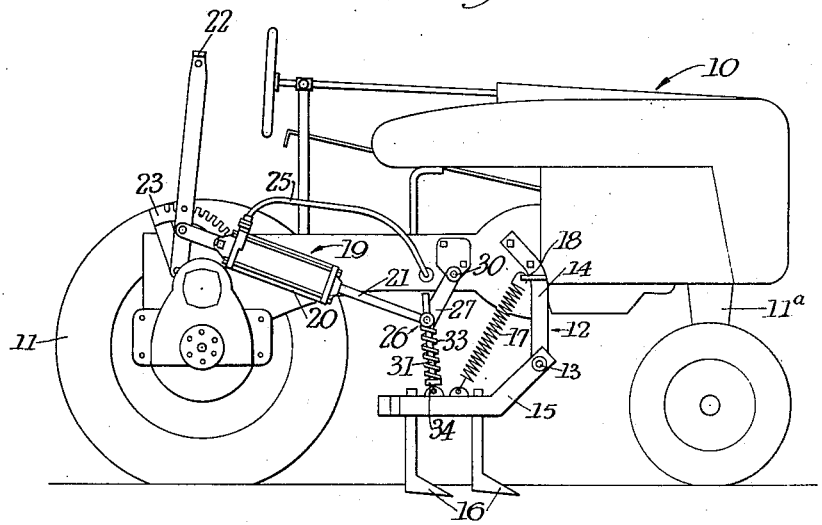
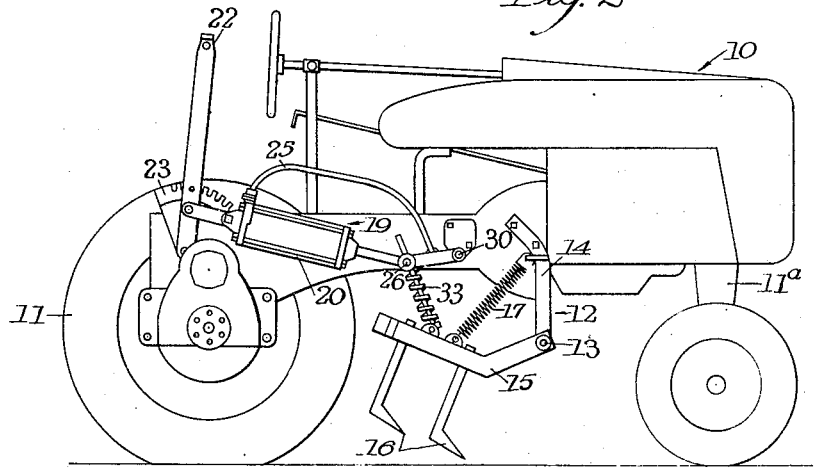
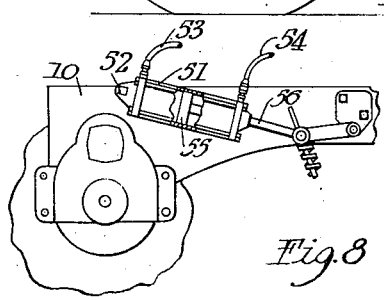
Inventor
Bert R. Benjamin
By Paul J. Pippel
Atty.

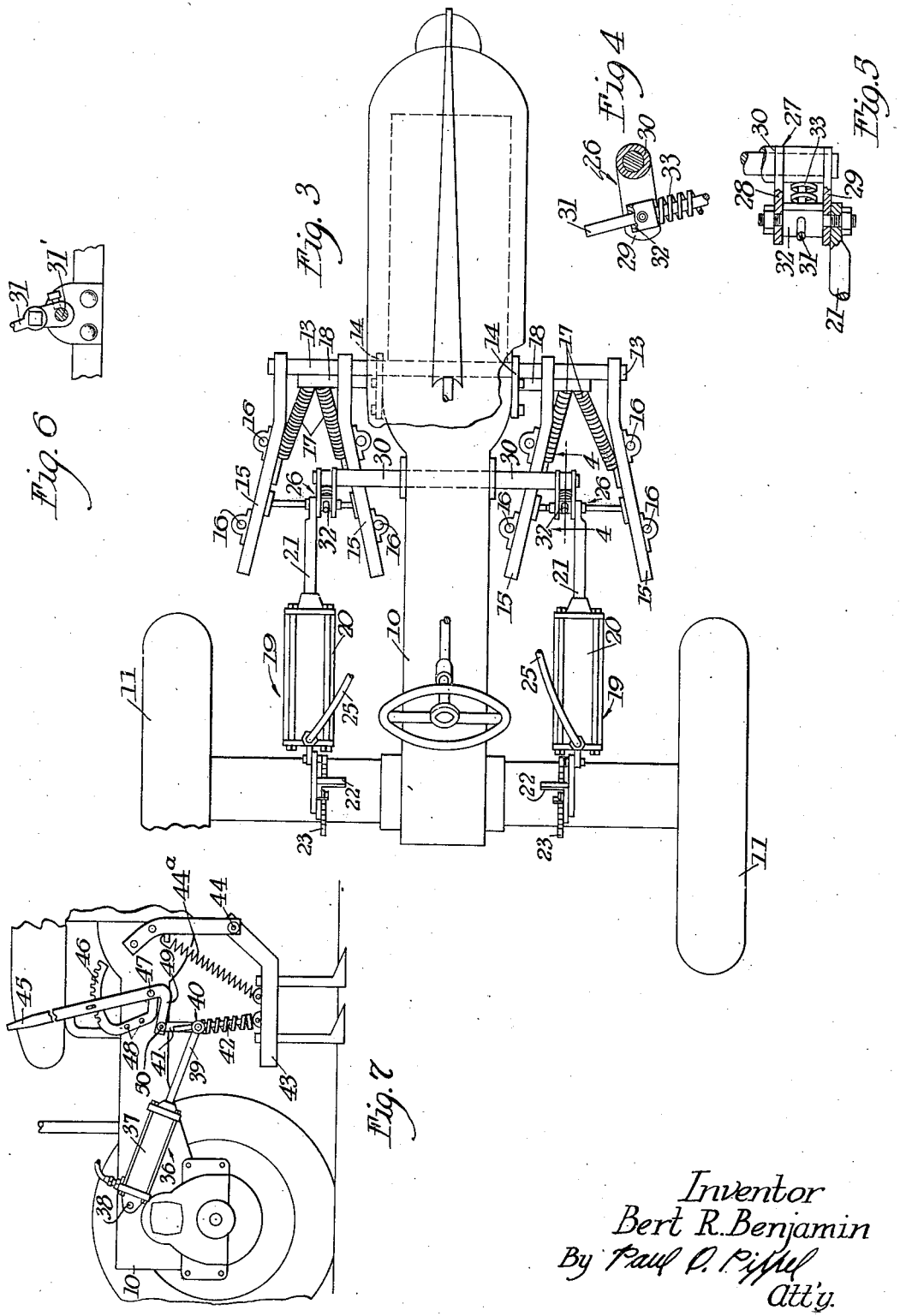

Patented Sept. 19, 1944

2,358,298

UNITED STATES PATENT OFFICE 2,358,298

TRACTOR-MOUNTED IMPLEMENT

Bert R. Benjamin, Oak Park, Ill., assignor to International Harvester Company, a corporation of New Jersey Application January 13, 1942, Serial No. 426,573

1 Claim. (Cl. 97—50)

This invention relates to an agricultural implement and more particularly to a lift means for such implement.

The invention pertains especially to a tractor-mounted implement in which the tractor has a longitudinally extending body carrying an implement rig, such as cultivator gangs or the like. Such implements generally consist of implement rigs mounted at each side of the tractor body. Lifting means of various types are carried on the tractor for lifting the implement rigs.

The invention contemplates and has for its principal object the provision of an improved means for lifting an implement arrangement such as that referred to above.

An important object is to provide an improved fluid-pressure arrangement for controlling movement of an implement rig.

Another important object is to provide a toggle link mechanism for lowering an implement rig.

A still further object is to provide an improved means for retaining the implement rig in its ground-working position.

Another object is to provide an improved means for adjusting the depth of a ground-working implement rig.

According to the present invention, a ground-working implement rig is connected to the tractor body for movement to and from a ground-working position. Means is provided for lowering the implement rig including a toggle link mechanism connected between a fluid pressure device and the implement rig. Means is also provided for raising the implement out of ground-working position including a resilient means, which may be in the form of springs, connected between the tractor and the implement rig. An adjusting means is connected to the toggle link mechanism for regulating the ground-working depth of the implement rig.

For a more complete understanding of the invention and for other objects of the invention reference may be had to the following detailed description taken in conjunction with the accompanying sheets of drawings, in which:

Figure 1 is a side elevational view of a preferred type of tractor-mounted implement including an improved lifting means;

Figure 2 is also an elevational view of the tractor-mounted implement showing operation of the lifting means for moving the implement out of ground-working position;

Figure 3 is a plan view of the tractor-mounted implement and lifting means therefor;

Figure 4 is a view taken along the line 4—4 of Figure 3 showing a portion of the toggle link mechanism;

Figure 5 is a view, partly in section, of the toggle link mechanism;

Figure 6 is a fragmentary view showing the connection of the toggle link mechanism to the ground-working implement rig;

Figure 7 is a side elevational view showing a modified form of the lifting and lowering means including an adjusting means; and Figure 8 is a partial elevational view of a lifting and lowering means for an implement showing a modified form of the construction.

The tractor chosen for the purposes of illustration is of a well-known type consisting of a narrow longitudinal body 10 carried on rear ground supports 11 and having a supporting structure 11a at its forward end. Connected to the tractor is an implement supporting structure, generally designated at 12. This structure includes a transversely extending rig-supporting member 13 connected to the tractor body by straps 14. Connected to the rig-supporting member 13 is a ground-working rig 15 carrying ground-working tools 16. The rig 15 is connected to the rig-supporting member 13 for pivotal vertical movement to and from a ground-working position.

The lifting and lowering arrangement for the implement rigs is constructed in the same manner for both sides of the tractor and only one side will be described. There is connected to the ground-working rig 15 a resilient means in the form of springs 17 connected to the tractor body by brackets 18. The springs 17 operate to lift the implement rig 15 out of ground-working position. For lowering the implement into the ground, there is provided a fluid pressure device generally designated at 19. This fluid pressure device includes a cylinder 20 and a piston rod 21. As shown in Figures 1, 2, and 3, the fluid pressure device 19 is connected to a manually operable lifting lever 22 connected to a quadrant 23 which is in turn connected to the tractor body.

The fluid pressure device is operated in the usual manner by means of fluid carried to the cylinder 20 through a conduit 25, from a pump, not shown, mounted in the tractor body. Connected to one end of the piston rod 21 is a toggle link mechanism generally designated at 26. This toggle link mechanism comprises a toggle link 27 formed of two straps 28 and 29. The free end of the link 27 is pivotally connected at one end to the tractor body by means of a supporting structure 30. The other end of the toggle link 27 is pivotally connected to the piston rod 21, as best shown in Figure 5. A second toggle link 31 is pivotally connected at its free end to the piston rod 21 by means of a trunnion member 32, also pivotally connected between the strap members 28 and 29 of the toggle link 27. This link 31 is connected for sliding movement through the trunnion member 32 at one end and is pivotally connected at its other end to the rig 15, as best shown in Figure 6 and indicated at 31'. Means for keeping the implement rig in ground-working position is provided in the form of a pressure spring 33 abutting the trunnion member 32 at one end and abutting a collar 34 fixed on the link 31 at its other end.

In operation, fluid is allowed to escape from the fluid pressure device 19, thereby decreasing the pressure in the cylinder 20, allowing the springs 17 to lift the implement rig 15 out of ground-working position. When it is desired to lower the rig back into ground-working position, fluid is allowed to enter the cylinder 20 operating the piston rod 21 and thereby effecting movement of the toggle link mechanism 26 causing the implement rig 15 to return to ground-working position. The pressure spring 33 at this point is strong enough to overcome and counteract the pressure of the springs 17 and therefore keeps the implement rig in ground-working position. Due to the fact, however, that the link 31 is slidably connected to the trunnion member 32, the rig 15 is free to pivot about the rig-supporting member 13 upon one or more of the working tools striking an obstruction.

In order to adjust or regulate the depth of the ground-working tools 16, the lifting member 22 is moved about the quadrant 23 thereby moving the toggle links and moving the implement rig to any desired depth position.

Referring now particularly to Figure 7, there is shown a lowering means, generally designated at 36, which comprises a fluid pressure cylinder 37 connected to the tractor body 10 as shown at 38. A piston rod 39 is connected to a toggle link mechanism 40 having toggle links 41 and 42. The toggle link 42 is connected to an implement rig 43 which is pivotally connected to the tractor, as shown at 44. A spring 44a connected between the tractor and the rig is provided for lifting the rig out of ground-working position. The fluid pressure device and toggle link mechanism operate in the same manner as previously described. However, for adjusting the ground-working depth of the implement, there is provided a manual lever 45 connected to a quadrant 46 which is in turn connected to the tractor body 10, by bolts 48. The lever 45 has a portion 49 to which is connected the link member 41, as shown at 50. This lever 45 is moved about the quadrant 46 thereby moving and allowing adjustment of the depth-working position of the implement rig.

As shown in Figure 8, another modified form of construction is provided. In this construction, a fluid pressure device comprising a cylinder 51 is secured to the tractor body 10, as shown at 52. This cylinder is used for lowering and lifting the implement and is therefore provided with a two-way fluid connection in the form of conduits 53 and 54 for allowing fluid to enter at either end of the cylinder, thereby moving the piston 55 in either one of two directions. The piston 55 is connected by means of a piston rod 56 to a toggle link construction similar to that already described. In this form, with the exception of the two-way fluid pressure device, the construction is generally the same, as previously described, and no further description is deemed necessary. However, it should be noted, in this form, that the fluid pressure device 51 is also used for adjustment of the ground-working depth of the implement rigs, therefore replacing manual adjustment for conditions where such adjustment is not possible.

It will be understood, of course, that only a preferred embodiment of the invention has been illustrated and described and that numerous modifications and alterations may be made therein without departing from the spirit and scope of the present invention as defined by the appended claim.

What is claimed is:

In combination, an implement frame, a working-tool rig connected to the frame and adapted to be moved to and from ground-working position, means for moving said rig from working position including a resilient means acting in an upward direction connected between the rig and the tractor, means for returning the rig to ground-working position including power means, toggle links having the free end of one of the links connected to the rig and the free end of the other link connected to the frame, means connecting the power means to the pivotal connection between the toggle links for actuating the toggle links to move the rig into ground-working position, and a second resilient means connecting the power means and the rig, said second resilient means acting in a downward direction with a substantially greater force than the first resilient means to counteract the lifting action of the first resilient means in the working position of the rig.

BERT R. BENJAMIN.